(12) United States Patent
Pembroke

(10) Patent No.: US 6,273,021 B1
(45) Date of Patent: Aug. 14, 2001

(54) OIL SPILL PREVENTION APPARATUS

(75) Inventor: Kevin Pembroke, 108 Beechwood Crescent, Glace Bay, Nova Scotia (CA), B1A 5Z2

(73) Assignee: Kevin Pembroke, Glace Bay (CA)

( * ) Notice: Subject to any disclaimer, the term of this patent is extended or adjusted under 35 U.S.C. 154(b) by 0 days.

(21) Appl. No.: 09/574,201

(22) Filed: May 19, 2000

Related U.S. Application Data

(63) Continuation-in-part of application No. 09/199,159, filed on Nov. 25, 1999, now abandoned.

(30) Foreign Application Priority Data

May 21, 1999 (CA) .................................................. 2272490

(51) Int. Cl.$^7$ ............................... B65D 1/34; G01F 23/02
(52) U.S. Cl. ........................ 116/228; 116/276; 220/571; 137/312; 126/355; 73/319
(58) Field of Search ..................... 116/109, 110, 116/227, 228, 229, 273, 276; 220/571, 563; 340/618, 620, 623; 141/311 A, 86; 137/312; 431/16; 126/355, 359; 73/40, 305, 307, 309, 310, 319

(56) References Cited

U.S. PATENT DOCUMENTS

| | | | | |
|---|---|---|---|---|
| 315,840 | * | 4/1885 | Roberts | 177/225 |
| 443,063 | * | 12/1890 | Allen | 116/228 |
| 717,309 | * | 12/1902 | Wiesner | 73/319 |
| 973,474 | * | 10/1910 | Cameron | 431/16 |
| 2,233,235 | * | 2/1941 | Witthaus | 116/228 |
| 2,531,159 | * | 11/1950 | Rowell | 220/563 |
| 3,353,615 | * | 11/1967 | Nekimken | 137/312 |
| 4,989,634 | * | 2/1991 | Rieseck | 137/312 |
| 5,100,024 | * | 3/1992 | Bravo | 137/312 |
| 5,301,722 | * | 4/1994 | Todd et al. | 137/312 |
| 5,417,344 | * | 5/1995 | Wells et al. | 220/571 |
| 5,550,532 | * | 8/1996 | Marshall | 340/618 |
| 5,878,902 | * | 3/1999 | Cowan et al. | 220/571 |
| 6,035,699 | * | 3/2000 | Parlante | 340/623 |

* cited by examiner

Primary Examiner—Andrew H. Hirshfeld
(74) Attorney, Agent, or Firm—Marks & Clerk

(57) ABSTRACT

An oil spill prevention apparatus for use with for a domestic oil storage tank has a catchment tray e located underneath an oil storage tank and extending over the entire footprint thereof. The catchment tray has a depression for pooling oil caught by the catchment tray. A level sensor for raises an alarm when the oil level in said depression exceeds a threshold value.

8 Claims, 2 Drawing Sheets

OIL SPILL PREVENTION APPARATUS

RELATED APPLICATIONS

This application is a continuation-in-part application of U.S. patent application Ser. No. 09/199,159, filed on Nov. 25, 1999, now abandoned.

BACKGROUND OF THE INVENTION

This invention relates to environmental protection, and more particularly to an apparatus for preventing oil spills from domestic oil storage tanks.

There is ever increasing concern over damage to the environment caused by pollution from man-made sources, and on-going efforts are underway to identify and eliminate sources of pollution. Domestic furnace oil storage tanks represent collectively a substantial source of oil leakage into the environment. Such tanks are typically made of steel and corrode over the years due to the acid content of the furnace oil. Slow seepage can occur without the homeowner's knowledge. Over the years a substantial quantity of oil can leak into the foundation, whether it be soil if the tank is located outside, or concrete, if the tank is located in a basement.

Not only is this environmentally harmful, the removal of contaminated soil or concrete is extremely expensive, since all the contaminated material has to be removed and transported to a hazardous waste site. The lingering smell from contaminated oil can render a house uninhabitable.

An object of the invention is to provide an apparatus capable of alleviating this problem.

BRIEF SUMMARY OF THE INVENTION

According to the present invention there is provided an oil spill prevention apparatus for use with for a domestic oil storage tank, comprising a catchment tray adapted to be located underneath an oil storage tank and extending over the substantially entire footprint thereof, said catchment tray having a depression for pooling oil caught by said catchment tray, and a level sensor for signaling an alarm when the oil level in said depression exceeds a threshold value.

The catchment tray preferably has a recessed bottom extending along its length with an elliptical contour in plan view. The depression amplifies the change in level of a small amount of oil spilt into the catchment tray, which allows as simple sensor arrangement to be employed. Preferably the catchment tray has apertures at its corners for the passage of the legs of a conventional oil storage tank.

The level sensor typically consists of a float on a stem actuating a microswitch. Other suitable level sensing devices can be employed.

The catchment tray is desirably made from a high density polyethylene, which does not absorb oil or any of its constituents.

The apparatus catches any oil leaking from the tank and informs the homeowner in time for remedial action to be taken before the oil enters the environment. The catchment tray can be molded at relatively low cost.

The invention will now be described in more detail, by way of example only, with reference to the accompanying drawings, in which.

DESCRIPTION OF THE PREFERRED EMBODIMENTS

Figure 1:
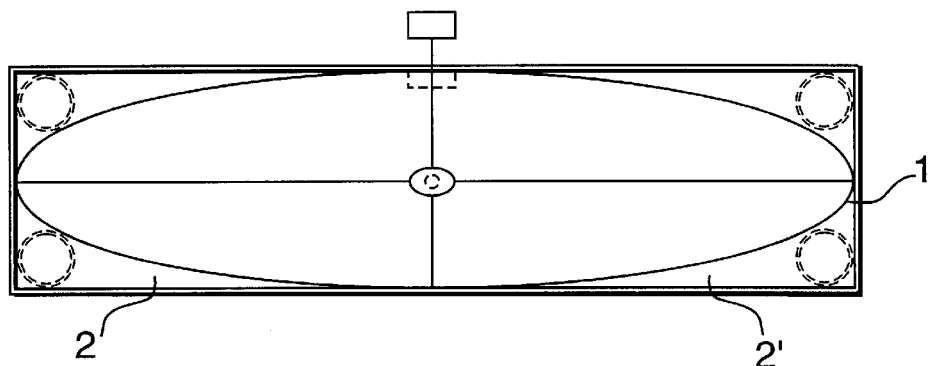
FIG. 1 is a plan view of an oil spill prevention apparatus in accordance with one embodiment of the invention.
Figure 2:
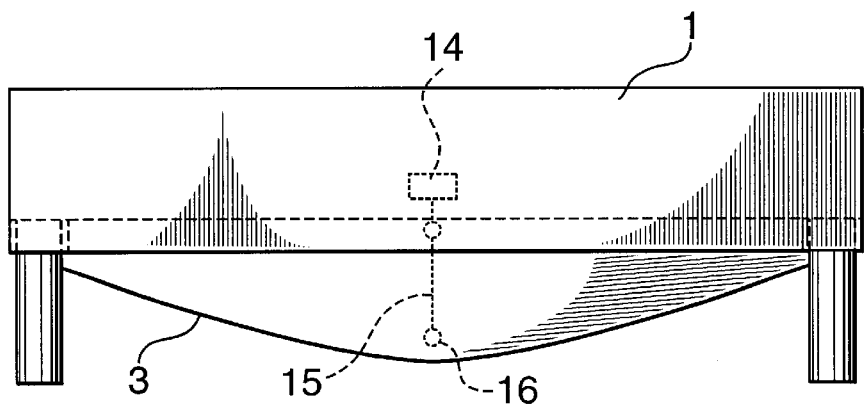
FIG. 2 is a front elevation of the apparatus shown in FIG. 1.
Figure 3:
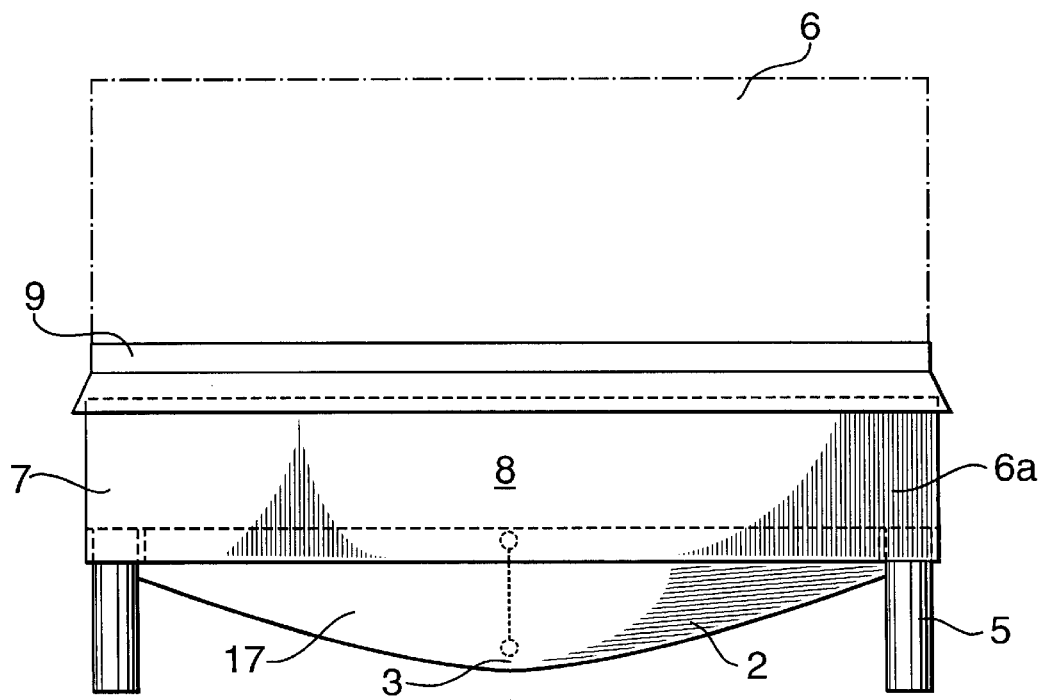
FIG. 3 is a side elevation of the apparatus shown in FIG. 1.

Referring to the drawings, the catchment tray 1 is rectangular in shape and molded in a unitary fashion from high density polyethylene or other material which is impervious to oil. The tray 1 has a flat bottom 2, in which is formed a depression 3 extending along the entire length of the tray. The depression 3 has an elliptical contour 2' in plan view. In cross section, the depression 3 is generally V-shaped with a slight concave curvature. Oil falling into the tray pools in the tray 3, so the depression 3 has the effect of amplifying the change in level for a given amount of oil falling into the catchment tray.

The catchment tray 1 has circular apertures at its corners, which are designed for the passage of the legs 5 of a conventional oil storage tank 6. The apertures are formed in flat corners portions of the bottom 2 of the tray outside the contour of the depression 3.

Figure 4:
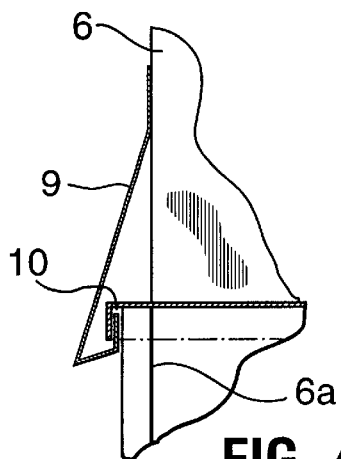
FIG. 4 is a detail showing flashing applied to the side of the tank.
Figure 5:
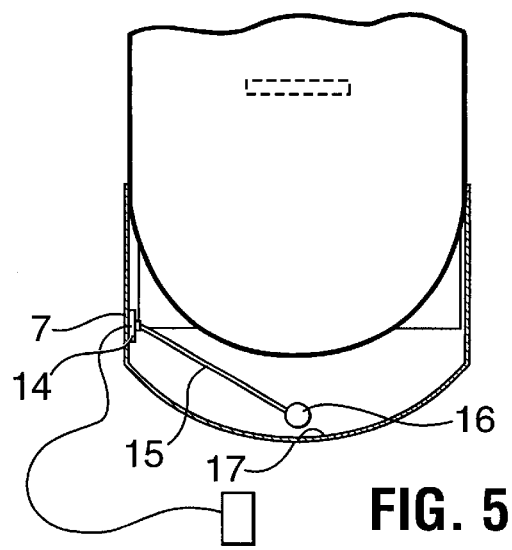
FIG. 5 is a sectional view through a tank and catchment tray.

The catchment tray 1 has sidewalls 7 which define a box frame 8 that snugly receives the lower portion 6a of the storage tank 6. Overhanging flashing 9, which is glued onto the side of the tank 6, extends downwardly and outwardly and overhangs the upper edge 10 of the sidewall 7 (FIG. 4). The lower edge of the flashing 9 terminates in a J-channel abutting the sidewall 7. This allows for air circulation and keeps moisture out of the catchment tray 1. It also helps to retain odors within the tray.

A switch 14 is attached to the internal sidewall 7 of the boxframe 8 and from which extends downwardly at an angle a stem 15 attached to a ball float 16 designed to be buoyant in oil in a similar manner to a cistern.

Any oil seeping from the tank 1 falls into the catchment tray 1 and flows under the action of gravity into the depression 3. There it pools as shown at 17 and causes the float 3 to rise. The pooling effect amplifies the change in level for a given quantity of oil. When the oil level reaches a predetermined threshold value, the rise in the float 3 actuates, through the stem 15, the switch 14, which can be connected to any conventional alarm device, such as a warning light, horn or other device. The switch 14 is of course designed to signal an alarm before the oil overflows the rim of the catchment tray 1.

The switch 14 can be replaced by other suitable electronic sensing circuitry responsive to the presence of oil in the catchment tray 1. For example, the rising oil can interrupt a light beam to generate an alarm signal.

Figure 6:
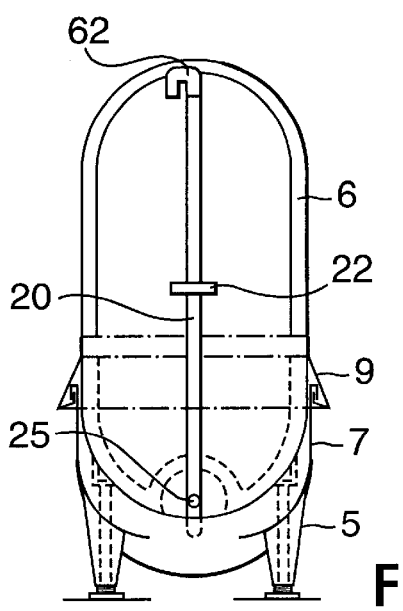
FIG. 6 is an end view of an oil tank with a catcment tray and visual alarm.
Figure 7:
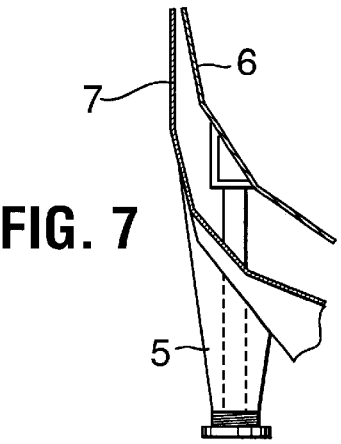
FIG. 7 shows a detail of FIG. 6.
Figure 8:
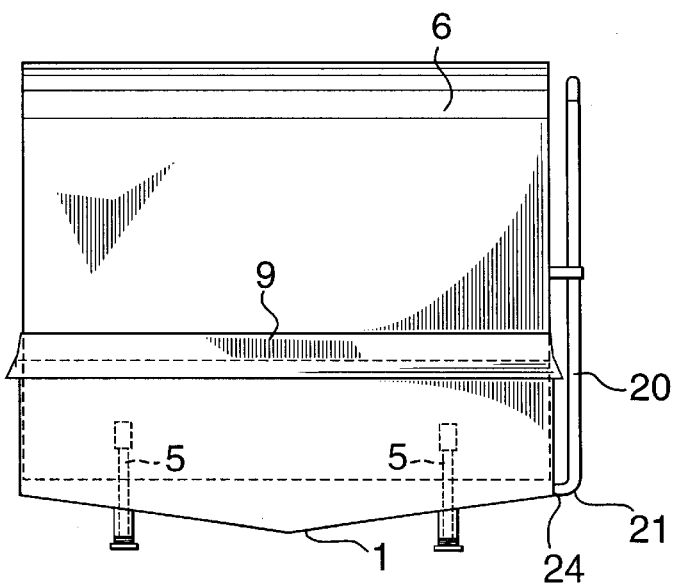
FIG. 8 is a side view of the tank shown in FIG. 6.

In the embodiment shown in FIG. 6, the catchment tray is sealed to the outside of the oil tank with a suitable sealant just below the flashing 9. A transparent vertical tube with an elbow 21 at the lower end communicates with the interior of the catchment tray through its end wall 24 and rises vertically adjacent the end wall 9 of the tank 6 so as to be clearly visible. The tube is attached to the end wall by means of a bracket 22 and has a vent 23 open to the atmosphere on top.

When leakage occurs, the oil from tank 6 first spills into catchment tray 1. As it rises, it reaches the opening to the tube 20 and gradually rises up the tube pushing up a floating visible alarm ball 25 as it does so. When the containment structure is full, the liquid level in the tube will continue to rise until it reaches the level of the oil in the tank in view of the seal between the catchment tray and the outside of the tank walls. When the levels are equalized, the oil level in the tube will remain constant, but will be easily visible due to the transparent nature of the tube and the ball 25, which is preferably brightly colored. This system both contains leakage and also alerts the user to the presence of leakage without the need for an electronic alarm.

The device can be wired to a house alarm with a reset/acknowledgement button and connected to an external security system. It can also be connected, for example, to a strobe light or audio alarm attached to the tank 6.

In alternative embodiment, the catchment ray can be provided with legs at the four corners. The legs on the tank 6 can be cut off, so that the tank can sit directly in the catchment tray with its legs aligned with the stub portions of the legs on the tray.

I claim:

1. In combination, a domestic oil storage tank and a catchment tray located underneath said oil storage tank for catching oil leaking therefrom, said catchment tray extending substantially over an entire area corresponding to a vertical projection of said oil storage tank onto a supporting surface and having a depression for pooling oil caught by said catchment tray, a level sensor for raising an alarm when the oil level in said depression exceeds a threshold value, and flashing attached to the sides of said oil tank and extending outwardly over the edges of said catchment tray, said flashing at its lower edge terminating in a channel adjacent the tank, and said catchment tray having an overhanging downturned lip extending into said channel to keep moisture out of said tray while permitting air circulation.

2. The combination as claimed in claim 1, wherein said catchment tray has an elliptically recessed bottom providing said depression.

3. The combination as claimed in claim 1, wherein said level sensor comprises a float extending into said depression, said float being mounted on a stem actuating a switch.

4. The combination as claimed in claim 1, wherein said catchment tray has apertures for the passage of the legs of said oil storage tank.

5. The combination as claimed in claim 4, wherein said catchment tray is generally rectangular and said apertures are located at the corners thereof.

6. The combination as claimed in claim 1, wherein said level sensor comprises a transparent tube communicating with said catchment tray and visibly showing the level of liquid in said catchment tray.

7. The combination as claimed in claim 6, wherein said transparent level tube includes a visible flotation device showing the level of liquid in the tube.

8. The combination as claimed in claim 6, wherein said catchment tray is sealed to the outside of said storage tank, and said transparent tube extends upwardly beside the tank so that in the event of leakage said level of liquid in said tube equalizes to the same level as liquid in the storage tank.

* * * * *